UNITED STATES PATENT OFFICE.

WILLEM VAN DER HEYDEN, OF AMSTERDAM, NETHERLANDS, ASSIGNOR TO THE FIRM OF NAAMLOOZE VENNOOTSCHAP ALGEMEENE UITVINDING EXPLOITATIE MAATSCHAPPY, OF AMSTERDAM, NETHERLANDS.

PROCESS FOR THE MANUFACTURE OF AN ELASTIC CAOUTCHOUC-LIKE SUBSTANCE FROM ANIMAL MATTER.

993,626.   Specification of Letters Patent.   Patented May 30, 1911.

No Drawing.   Application filed June 7, 1910.   Serial No. 565,613.

*To all whom it may concern:*

Be it known that I, WILLEM VAN DER HEYDEN, a subject of the Queen of the Netherlands, residing at Amsterdam, Netherlands, have invented a certain new and useful Process for the Manufacture of an Elastic Caoutchouc-Like Substance from Animal Matter, of which the following is a specification.

This invention relates to a novel process for the manufacture of an elastic substance from animal matter, which can replace caoutchouc.

In carrying out the invention, I may use fishes with hard or cartilaginous bones, *Mollusca* or the mucous membrane and other parts of the intestines of mammals.

Fishes, especially bone fishes, are placed on a moderate fire with sufficient cold water and are heated for about two hours to a temperature from 90 to 100 C., whereupon the broth is filtered off from the flesh. Within this broth, various albuminous substances are obtained, which are not to be met in the usual meat-broth. The broth is then sufficiently acidulated by means of acetic acid, or, if desired, by lactic acid, to obtain a noticeable acid reaction, when a multitude of large white flocks will appear, which gradually precipitate upon the bottom. When the substance thus precipitated is filtered off, all color reactions of albumin substances can be obtained, for instance with the xanthoproteic test, the biuret test or Millon's test. When the precipitate of the above mentioned flocks or substance has been obtained by treatment with acetic acid, the albumin does not redissolve with an excess of acetic acid. This albumin, which was soluble in ordinary neutrally reacting water and has been precipitated without boiling by acetic acid, has probably been transformed into a complicated albumin group.

On testing for a glucose reducing substance by means of prolonged boiling in weak hydrochloric acid solution, it is found, that such substance is not present. On treating with artificial gastric juice, however, the so formed albumin substance dissolves completely. If the albumin substance is carefully carbonized and thereupon moistened with a few drops of water, there is obtained a strong acid reaction. On testing the albuminous substance for phosphoric acid possibly present, it has been found, that the albuminous substance contains a considerable amount of phosphorous. If the thus obtained albuminous substance is extracted with 80% alcohol at a temperature of 40 C. for several hours, one finds dissolved in the alcohol an orange colored substance, which upon evaporating the alcohol yields a considerable amount of a wax-like, orange-colored substance. This above mentioned albuminous substance dries, when spread on a glass plate to a colorless transparent membrane.

If the still acid reacting broth or liquid, obtained after filtering off the last described albuminous substance, is slowly evaporated and the temperature of the liquid reaches about 46 C., gradually whitish flocks are observed to appear, which increase with increasing temperature up to about 50 C. Also in this case another albuminous substance is formed, coagulating at the said given temperature in acid liquid. This second albumin is filtered off, and it is shown that that this albumin is present in considerably smaller quantities than the first precipitated albuminous substance, more fully described above. If thereupon, after the second separation of albumin has taken place and the liquid has been filtered off, the remaining liquid or broth is naturalized by means of a solution of ammonia of soda, and is then saturated with ammonium sulfate in the cold, considerable quantities of a further third albuminous substance are precipitated, which probably is albumose. If this albuminous substance is filtered off peptones can be proved by means of the biuret test and precipitated by means of tannic acid to which some acetic acid may be added.

As can be seen from the above, the broth or liquid in which the fishes are boiled, contains very considerable quantities of different albuminous substances and these albuminous substances counted together amount to about 5 per cent. of the weight of the fish. It has been observed, that when boiling the fishes those albuminous substances containing phosphorus (phosphor-albumins) occur less or disappear when the fishes are boiled at spawning time. These above described albuminous substances obtained when boiling fishes under ordinary barometric pressure, can also be obtained when mucous membranes of the intestines of mammals or other fresh or sea water animals are treated in a manner similar to that above described. Among the latter the *Echinodermata* (ray fishes) have to be particularly mentioned, which have no calcareous deposition in the skin, and under which group especially the so-called seacucumbers and furthermore the cuttle-fish, sea-nettles and medusae deserve special mention.

If from a fish stew the above mentioned albuminate containing phosphorus, which the inventors principally used as a nutritive medium for bacteria, is precipitated and filtered off, the remaining liquid, as already described above, is from the acetic acid of acid reaction. This liquid is again put on the fire and the water slowly evaporated therefrom, the evaporation being aided by employing a vacuum. After the liquid having been very considerably evaporated a very strong membrane appeared on its surface. This membrane adheres firmly to the walls of the boiling pan and was continuously scraped off and held together by means of a stirring device, so that continuously new surfaces of the liquid were exposed to the air, whereby at once new membranes were formed until the entire liquid had disappeared and was changed into a more consistent mass. The thus formed and collected membranes formed a mass easily drawn into threads and showing more cohesion than adhesion, *i. e.* the thus formed substances form a mass easily drawn into threads which adheres more to itself than to foreign bodies. This substance which principally contained albuminous substances and free acetic acid, was further for some time dried in a drying oven and thereupon disinfected by means of a 5 per cent. solution of formaldehyde. In this way, a peculiar elastic mass resistance against tension and pressure was obtained.

The formaldehyde only serves, as preventative against a non-desired fermentation or other change of the above described mass. The formaldehyde has thus a totally different object than the hardening of albuminous substances. On the contrary, the whole of the thus formed substances dissolve almost completely in formaldehyde and then serve as excellent medium, in order to glue together two parts of the above-mentioned elastic substance, or to coat this substance with this medium.

The thus obtained new elastic substance has the following properties: 1. The resistance against tension and pressure is very considerable, provided that the elastic mass is well dried. 2. The elastic mass can be treated in a known manner with sulfur in the vulcanizing process and yields then rubber like products. 3. Sulfur can be added to the mass in such quantities that the substance loses its elasticity and shows properties similar to ebonite. 4. The thus obtained mass does not conduct electricity. 5. The new mass does not dissolve in the ordinary solvents of caoutchouc. 6. The mass does not dissolve in carbon bisulfid, benzin, petrolether, turpentine, strong alcohol. 7. In weak alcohol the mass swells up a little, and during this dissolving process coloring matters of the mass go into solution; the substance is therefore bleached. 8. If well dried and vulcanized, the new elastic substance no longer dissolves in water nor in weak solutions of formaldehyde. 9. If the elastic substance is well vulcanized it does not become hard and brittle when cold, nor doughy or sticky when hot.

The above mentioned elastic mass was produced from fishbroth according to the method described after removing or filtering off the first formed albuminous substance (phosphor-albumin). However, the last named substance can also be embodied in the elastic mass. In this case from the fish broth a quantitatively considerable higher yield is obtained without injuring the good qualities of the elastic mass.

It must be mentioned here, that the manufacture of the phosphorus containing albuminous substance has to be regarded as a very valuable byproduct in itself, as it is a highly valuable food stuff.

If the phosphorus containing albuminous substances is also contained in the elastic final product, it is lost as food stuff and is contained together with the above described further albuminous substances in the final product. However, in this case no free acetic acid is present in the final product, as in this modified method no acid is employed at all.

In order to enable the by-products which are obtained in this process to be profitably used, the following is mentioned: The muscular flesh of the fish contained in the broth, which is still present in considerable quantity, may be utilized in various manners. Perhaps it may be desirable to peptonize the same without delay by means of artificial gastric juice. If these dissolved peptones freed before from hydrochloric acid by neutralization are slowly concentrated by evaporation, then again a membrane and a mass easily to be drawn into threads is obtained, which however, after drying becomes hard and brittle and is very little elastic. It has further been found, that the above described peptones can be preferably transformed to ebonite-like substances by a fargoing vulcanization, and thus can find further use for industrial purposes. If the fish residue has now been freed by peptonization from the muscular flesh, the skeleton parts and the bones remain. These are placed in hydrochloric acid to remove the lime. When the bones thereupon have become transparent they are after careful washing boiled together with the entrails, stomach, intestines, etc., cut out and laid aside when cleaning the fish, in boilers until the whole has been transformed into glue. Besides the glue, of course, also the phosphates of lime and magnesia are obtained, which can be made use of as valuable fertilizers.

The natatory bladders of large fishes are separately treated and are used in a known manner for the manufacture of gelatin. The liver of the above mentioned fish used for boiling is freed from fat by means of benzin.

The last described operation has been duly mentioned in order to show how the entire fish can be industrially utilized and employed.

In conclusion it is mentioned that the new elastic substance can be mixed in any percentage with ordinary caoutchouc, the process of vulcanization can be effected with the mixture as well as with the individual materials.

Having now particularly described and ascertained the nature of my said invention, and in what manner the same is to be performed, I declare that what I claim is, 1. Process of manufacturing an elastic caoutchouc-like substance consisting in heating in water animal materials such as fishes, *Mollusca* or the mucous membranes of the intestines of mammals, filtering off the broth thus obtained, evaporating the broth to form an elastic substance, adding sulfur to said substance, and vulcanizing the resulting mixture.

2. Process of manufacturing an elastic caoutchouc-like substance consisting in heating in water animal materials such as fishes, *Mollusca* or the mucous membranes of the intestines of mammals to form a broth containing phosphor-albumin, separating said albumin from the broth, neutralizing and drying the phosphor-albumin, evaporating the broth until an elastic substance is formed, adding caoutchouc to the substance, and vulcanizing the resulting mixture.

In witness whereof I have hereunto signed my name in the presence of two subscribing witnesses.

WILLEM van der HEYDEN.

Witnesses:
 Dey Denhoslarch,
 J. Jurgen.